2,885,291

BRANDING POULTRY

John F. Sengelaub, Jr., Park Forest, and Merritt I. Darrow, La Grange, Ill., assignors to Swift & Company, Chicago, Ill., a corporation of Illinois No Drawing. Application July 9, 1956
Serial No. 596,422

3 Claims. (Cl. 99—107)

This invention relates generally to a process for branding skin tissues. More particularly, the invention relates to a process adapted for the use in the branding of moist low fat items such as poultry.

It has been desired for some time to find a process which would make possible the branding of poultry. Poultry is about the only form of meat which is not amenable to the usual branding type process. It is not suitable for poultry because of the peculiar nature of the poultry skin. In the case of ordinary meat products, the brand is applied to the meat itself or to the fat. However, in the case of poultry one attempting to secure a brand is dealing with the skin rather than the meat flesh itself. Poultry skin is fragile and, when split or broken, has a tendency to behave somewhat in the fashion of an inflated toy balloon which has been punctured with a pin. Once the initial break is made, it continues to tear. Further difficulties are presented because of the fact that in the normal processing of poultry immediately following the picking and eviscerating, the birds are kept very moist and are then submerged in ice slush for a substantial period of time, generally several hours, to remove the body heat. This type of chilling, with the normal method of shipping, involving packing in shaved ice, results in the production of a relative humidity on the surface of the poultry of 100%. The problem of shrinkage in poultry is also handled through the use of high humidities. Accordingly, at the logical times for brand application, poultry almost always is found to have water actually standing on the surface.

In cold-stamping moist poultry skin with suitable marks, the ink shows a tendency to run with the result that the legend becomes indefinable and entirely unsatisfactory. High temperature branding has been attempted since it enables the securing of a permanent and relatively legible mark. However, in the case of poultry, it has been found objectionable in that it sears through and separates the skin and results in a burned or wrinkled appearance. Another of the established methods of providing identification for meat items is needle penetration. In the case of poultry, however, the puncturing action coupled with the natural tension of the poultry skin results in its being torn apart in the area of the application of the brand. Furthermore, the needle used to apply the brand application punctures both skin and the tissue which is found beneath the surface with the result that dye is deeply embedded within the meat tissues and may diffuse under the moist conditions resulting in discolored meat which may be confused with a bruise. Even very fine needles have been inadequate to produce satisfactory results through this method.

The use of decalcomanias has been attempted but it has been found that these do not adhere to the skin sufficiently to serve the purpose.

As a result, cardboard tags are used almost exclusively to apply a trademark identification to poultry. These may be tied or clipped to the birds. However, such tags or clips may come off readily during the handling of the poultry and, therefore, are not the best possible solution.

Accordingly, it is an object of this invention to provide a method for branding poultry items which does not involve the use of tied-on or clipped-on tags.

It is a further object of this invention to provide a method for branding poultry items which, while involving the application of the mark directly to the skin, does not damage the surface tissues and, furthermore, impresses a mark which is not easily blurred or rendered indistinguishable even when high humidities prevail.

An additional object is to provide a method which is particularly suited for branding low temperature scalded poultry.

Additional objects and advantages, if not specifically set out, will become apparent during the course of the discussion which follows.

Broadly, this invention comprises a process of impressing a suitable trademark identification in brand form to whole birds or to cut-up poultry. The process first involves the removal of a substantial portion of the moisture which is present upon poultry following the picking, eviscerating, etc. This is done preferably through the use of a heated iron, or less desirably through a blast of air or capillary action; i.e. an adaptation of a blotter. Following this a branding iron containing a suitable ink at a temperature of between about 200° F. and 550° F., and preferably between about 200° F. and 350° F., is pressed against the surface of the skin. The effect of this process is, first, to remove the excess moisture which would ordinarily cause the ink to run. The ink, in the process of volatilization on the heated brand, is transferred to the skin, but does not readily run because moisture is not present in excess and a clean well-defined brand is achieved. The heat of the iron causes a rapid drying of the dye on the exterior surface of the skin with the result that the colored liquid is not allowed to penetrate into the flesh and spread into the tissue beneath the skin surface.

More particularly, this invention relates to a process especially adapted for use in the branding of poultry which has been scalded in customary fashion either at 128° F. or 140° F. Scalding at about 128° F. so loosens the epidermal layer that it tends to slough off during handling. Where the higher temperature is used, the epidermal layer is removed during the scalding operation itself. This damaging of the epidermal layer makes it necessary that any brand which is to be applied be applied not to the layer which will be lost, but rather to the dermal layer which is beneath.

As the surface tissues are moist, some form of preconditioning is necessary. In its preferred embodiment, this involves treatment with a heated iron having a blank plate thereon, within the temperature range 200° F. to 350° F. Conceivably treatment with an air-blast or blotter-type arrangement which removes the excess moisture could be substituted. This pretreatment prevents the running (and blurring) of the ink but avoids undue dehydration of the surface tissue as would result were a very hot drying plate used. This is especially important as it is necessary that enough moisture be present on the skin to facilitate the transference of the ink from the heated brand to the skin layer being marked. Immediately following this pretreatment, a stamp having the brand on the surface is impressed onto the skin. Preferably, this brand is maintained at a temperature of about 350° F. but may be used anywhere within the range 200° F. to 550° F. with more or less satisfactory results, dependent on the time the stamp is held in place. If the epidermal layer or cuticle is not already free, proper use of the heated brand will cause its removal. Lower temperatures than those mentioned above do not produce a permanent brand while higher temperatures result in yellow undertones throughout the branded area (where the type ink described below is used) and a certain amount of parting of the skin results. A slight sideways movement of the blank iron as it is pressed against the skin will insure removal of any remaining cuticle. Because the brand is at a relatively high temperature most of the volatile portions of the ink are driven off prior to the actual contact with the skin, and, for all practical purposes, the ink appears dry upon the surface of the stamp. However, when the stamp comes into contact with the skin surface, the residual moisture upon the skin softens the ink and causes it to be clearly transferred. This is the reason that all moisture must not be removed from the skin before the stamping is effected; rather only that portion of the moisture which is visible and which would tend to cause the ink to run and render the brand illegible. Because of the heat of the iron and the fact that the ink is largely non-water-soluble, the ink is never in a genuinely liquid state and is not, therefore, able to penetrate beneath the surface of the skin and diffuse to produce a blurred mark.

A suitable ink for use in this process may be readily prepared from certified coloring or inking compositions such as FD & C Yellow #3 and FD & C Red #3 as set forth in the Federal Food, Drug and Cosmetic Service, vol. 1, of the Commerce Clearing House, Inc. Acetone, alcohol and water in admixture serve as a solvent, the alcohol to acetone ratio preferably being about 10 to 1. The ratio of yellow to red may, of course, be varied to achieve a suitable highlighting (a function of the red component) together with satisfactory clarity and legibility (primarily functions of the water-insoluble yellow component). The amount of acetone or alcohol solvent to be used can be caried, conditions being optimum when the ink is carried on the heated stamp in an apparently dry condition as described above and is readily softened and transferred on contracting the residual moisture on the poultry skin.

An example is set forth below for purposes of illustrating the invention, but is not to be construed as placing limitations on its scope other than as are called for in the appended claims.

A chicken which had been subjected to a low temperature scalding operation (about 128° F.) was selected. The scalding loosened the epidermal layer but not so much so as to cause it to entirely slough off during subsequent handling. The bird was eviscerated and otherwise handled in the conventional manner before being immersed in slush ice for three hours to remove the body heat. At the completion of the chilling operation, the chicken was removed from the slush ice container and briefly drained. The preconditioning or drying brand used was of an area approximating that of the embossed stamp. Both were alike in that an electrical resistance housed within provided means for raising and controlling the plate temperature. The blank or dummy plate was heated to a temperature of 300° F. and pressed against a portion of the remaining moist epidermal layer. A slight lateral movement was imparted to the plate with the result that the epidermis was pushed aside and the dermal layer exposed. This to was moist so that a further application of the blank plate for a few seconds until the layer appeared substantially dry was necessary.

The marking plate carrying the dye was maintained at a temperature of about 350° F. The ink used comprised equal portions of FD & C Yellow #3 and FD & C Red #3 dissolved in alcohol (grain, denatured with 10% acetone) and about 25% water (based on the alcohol-acetone volume). The water served as a solvent for the red dye and the alcohol served for the yellow. The now more or less invisible moisture on the skin surface softened up the ink and facilitated the ink transfer as the heated stamp was pressed against the cleaned and dried dermal surface for a few seconds. The yellow formed the most apparent portion of the resultant mark, with the red, part of which washed off during the subsequent chilling operation in slush ice, supplying the highlighting and generally adding more life to the mark.

The described method makes it possible to impress any desired mark upon poultry surfaces without damaging the skin or producing a blurred mark. Such results are achieved through the preconditioning step which allows control of surface moisture and through the use of a brand operated at the particular temperatures described. Where the poultry is scalded at a high temperature (in the neighborhood of 140° F.), the fragile epidermal layer is already gone, and where low temperature scalding is employed, thereby merely loosening but not entirely removing the cuticle, the application of the heated brand in the proper fashion completely frees it and exposes the dermal layer.

Obviously many modifications and variations of the invention as hereinbefore set forth may be made without departing from the spirit and scope thereof, and therefore only such limitations should be imposed as are indicated in the appended claims.

We claim:

1. A process for branding poultry which comprises: removing the epidermal layer from the area to which the brand is to be applied by low temperature scalding; drying the surface of said area; and thereafter contacting said area with a brand bearing a water-insoluble dye, said brand being maintained at a temperature between about 200° F. and 550° F.

2. The process of claim 1 wherein the dye bearing brand is maintained at a temperature of about 350° F.

3. A process for branding whole poultry and cuts thereof which in preparation have been subjected to a scalding operation at a temperature sufficiently high to cause sloughing off of the epidermal layer, which comprises removing any moisture from the area to which the brand is to be applied by the application of heat at a temperature between about 200° and 300° F., and then contacting said area with a brand containing a water insoluble dye at a temperature between about 200° and 550° F.

References Cited in the file of this patent

UNITED STATES PATENTS

| | | |
|---|---|---|
| 1,986,783 | Adler | Jan. 8, 1935 |
| 2,083,765 | Williams | June 15, 1937 |
| 2,578,150 | Rathke | Dec. 11, 1951 |
| 2,622,513 | Rinehart et al. | Dec. 23, 1952 |